US007984362B2

(12) United States Patent
Golub et al.

(10) Patent No.: US 7,984,362 B2
(45) Date of Patent: Jul. 19, 2011

(54) METHOD FOR STATIC FAULT CODE SYNCHRONIZATION IN AN INTERNAL COMBUSTION ENGINE

(75) Inventors: Tomislav I. Golub, Birmingham, MI (US); Frank S. Groer, West Bloomfield, MI (US); Bernd Martin, Deutschland (DE)

(73) Assignee: Detroit Diesel Corporation, Detroit, MI (US)

( * ) Notice: Subject to any disclaimer, the term of this patent is extended or adjusted under 35 U.S.C. 154(b) by 917 days.

(21) Appl. No.: 11/938,931

(22) Filed: Nov. 13, 2007

(65) Prior Publication Data

US 2008/0155384 A1   Jun. 26, 2008

Related U.S. Application Data

(60) Provisional application No. 60/877,077, filed on Dec. 22, 2006.

(51) Int. Cl.
*H03M 13/00* (2006.01)

(52) U.S. Cl. ............... 714/775; 714/25; 714/31; 701/33

(58) Field of Classification Search ................... 714/775, 714/31, 25; 701/33
See application file for complete search history.

(56) References Cited

U.S. PATENT DOCUMENTS

| 5,007,100 | A | 4/1991 | D'Aoust et al. |
| 6,484,109 | B1 * | 11/2002 | Lofall ............................ 702/56 |
| 6,629,271 | B1 | 9/2003 | Lee et al. |
| 6,718,425 | B1 | 4/2004 | Pajakowski et al. |
| 7,082,359 | B2 | 7/2006 | Breed |
| 7,159,154 | B2 | 1/2007 | Lee et al. |
| 7,191,040 | B2 * | 3/2007 | Pajakowski et al. ............. 701/1 |
| 7,747,904 | B1 * | 6/2010 | DeMarco et al. ............... 714/48 |
| 2007/0190978 | A1 * | 8/2007 | White et al. ............... 455/412.1 |

* cited by examiner

*Primary Examiner* — M. Mujtaba K Chaudry
(74) *Attorney, Agent, or Firm* — Bill C. Panagos; Rader, Fishman & Grauer PLLC

(57) ABSTRACT

A method to synchronize Fault Code Memory between at least a first module and a second module in an engine controller unit; each said module in electronic communication with each other and having volatile and non volatile memory; said modules in electronic communication; when compatibility of versions of static fault codes between the modules is established, the first module downloads and saves the static fault code table resident on the second module in nonvolatile memory for access by a diagnostic tool.

6 Claims, 3 Drawing Sheets

METHOD FOR STATIC FAULT CODE SYNCHRONIZATION IN AN INTERNAL COMBUSTION ENGINE

CROSS-REFERENCE TO RELATED APPLICATIONS

The present application claims priority to U.S. Provisional Application Ser. No. 60/877,077 filed on Dec. 22, 2006, the contents of which are incorporated herein in their entirety.

BACKGROUND OF THE INVENTION

There has been a movement in heavy duty diesel engine controllers toward a two module controller system. In prior two module Electronic Control Units (ECUs), a first module received the second module fault information over an ECAN ID 1629, however the information provided in that message used the second module Monitoring Unit Identification (MUID) as the fault identifier. The first module was then required to translate the second module MUID to meaningful J1587 PID/FMI and J1939 SPN/FMI combinations. In order for that translation to take place, the first module had to keep a cross reference table of all possible second module MUID's and their relation to PID/SID numbers. The second module implemented the second module static fault table in ROM at compile time, meaning that the Fault Code Module (FCM) data compatibility was achieved only when the latest version of the first module software was used together with the equivalent or older versions of the second module software. A strict discipline with the second module fault table updates had to be observed such that no new Diagnostic Trouble Codes (DTCs) were added without prior communication with the second module software personnel. The core weakness of this arrangement is an inherent inability to handle random usage of various first module/second module software versions and the persistent reliance on flawless communication between the second module and the first module development community.

In order to alleviate these shortcomings, automated fault code memory synchronization from the second module to the first module is desirable. This ensures that the first module is always in possession of the exact fault code table based on which the given second module is operating and the second module is free to rearrange its static fault code table as necessary from one software release to the next. New MUIDs can also be added and the unused ones can be freely deleted.

1. Field of the Invention

The present invention relates to a method to synchronize fault codes between at least two modules within an engine controller.

The present invention further relates to the synchronization of fault codes between a first module, such as a Common Powertrain Controller (CPC2), and a second module, such as a Motor Control Module (MCM) in an engine controller that ensures that the static fault code versions between the two modules are compatible before downloading begins.

The present invention further relates to a method to synchronize fault codes between a CPC2 controller and the MCM controller in an engine controller wherein the CPC2 controller acts as a diagnostic gateway for the MCM on an SAEJ1587 and SAEJ1939 data link and reports all MCM faults on those two data links for Unified Diagnostic Services (UDS).

2. Description of the Related Art

Lee, et al., U.S. Pat. No. 6,629,271 discloses a computer processor that includes a replay system to replay instructions that have not executed properly in the first event pipeline coupled to the relay system to process instructions including any replayed instructions. A second event pipeline is provided to perform additional processing on an instruction. The second event pipeline has an ability to detect one or more faults occurring therein. The processor also includes a synchronization circuit coupled between the first event pipeline and the second event pipeline to synchronize faults occurring in the second event pipeline to matching instruction entries in the first event pipeline.

Lee, et al. U.S. Pat. No. 7,159,154 discloses a computer processor that includes a replay system to replay instructions that have not executed properly. In the first event pipeline coupled to the relay system to process instructions including any replayed instructions. A second event pipeline is provided to perform additional processing on an instruction. The second event pipeline has an ability to detect one ore more faults occurring therein. The processor also includes a synchronization circuit coupled between the first event pipeline and the second event pipeline to synchronize faults occurring in the first and second event pipeline to matching instruction entries in the first event pipeline.

SUMMARY OF THE INVENTION

The present invention is a method to synchronize fault codes between a first module, such as a Common Powertrain Controller (CPC2) and a second module, such as a Motor Control Module (MCM), in an Electronic Control Unit (ECU). The first module acts as a diagnostic gateway for the second module on an SAEJ1587 and SAEJ1939 data link and reports all second module faults on those two data links. In operation, at the beginning of each ignition cycle, the first module reads the second module current static fault code table version via a UDS service routine. If no response or an invalid response for this request is received within a specified period of time, for example 500 milliseconds, the first module repeats the request two more times with 500 millisecond gaps in between each response. If the response is still not received the first module waits for another specified time interval of, for example, three seconds, and repeats the sequence. If no response is received the first module activates a static fault code memory unavailable failure in the second module and the first module aborts the static memory synchronization request for the duration of the ignition cycle. If the first module receives a valid response to the second module version request, it compares the newly communicated version to an internally stored value and if either of the two version components plus a checksum do not match, the first module commences the synchronization process via UDS service routines. If the first module is new or at any time after a EEPROM reset or after the execution of a service routine, the non-volatile elements containing the second module versions information are set to zero. In order to download the second module static fault code table, the first module loops the UDS service routine from zero. The first module accepts all sent data from the second module without range checks so that the checksums can be properly verified. A range check is performed over all data values just prior to the data usage. If any of the provided values fall outside the allowed range, the first module logs an invalid static DTC data range, any values outside of the valid range is limited to a maximum valid value.

While downloading, the first module adds each received byte to the checksum in order to finally compare the checksum of the entire received table against the one provided by the second module in the version information. Should the two checksums not match, the first module repeats the entire synchronization sequence starting with the version request. If after the second attempt, the checksums still do not match, the first module aborts the synchronization process and logs a static fault code CRC fault in the memory of the second module.

If the checksums match, the first module commences writing the entire second module static table to a non-volatile memory, followed by non-volatile storage of the new versions and checksum information. At this point, the download process is deemed successful and the processing of the DM message is allowed to resume. Upon the next ignition cycle, the first module recovers a static fault table from flash memory and, in the process, re-computes the checksum. If the re-computed value does not match the one stored with the second module version information, the first module commences a new download sequence. This ensures any errors that might have occurred during flash write in the previous cycle are corrected. Following successful internal checksum comparison, the first module requests the previously described version information from the second module. If a valid response to this version request is received and the newly communication version information with checksum is identical to internally stored set of values, the first module determines the synchronization process complete.

Once the static fault code data is synchronized between the first and the second module, the first module acts as a diagnostic gateway to the second module.

DETAILED DESCRIPTION OF THE PREFERRED EMBODIMENT(S)

Figure 1:
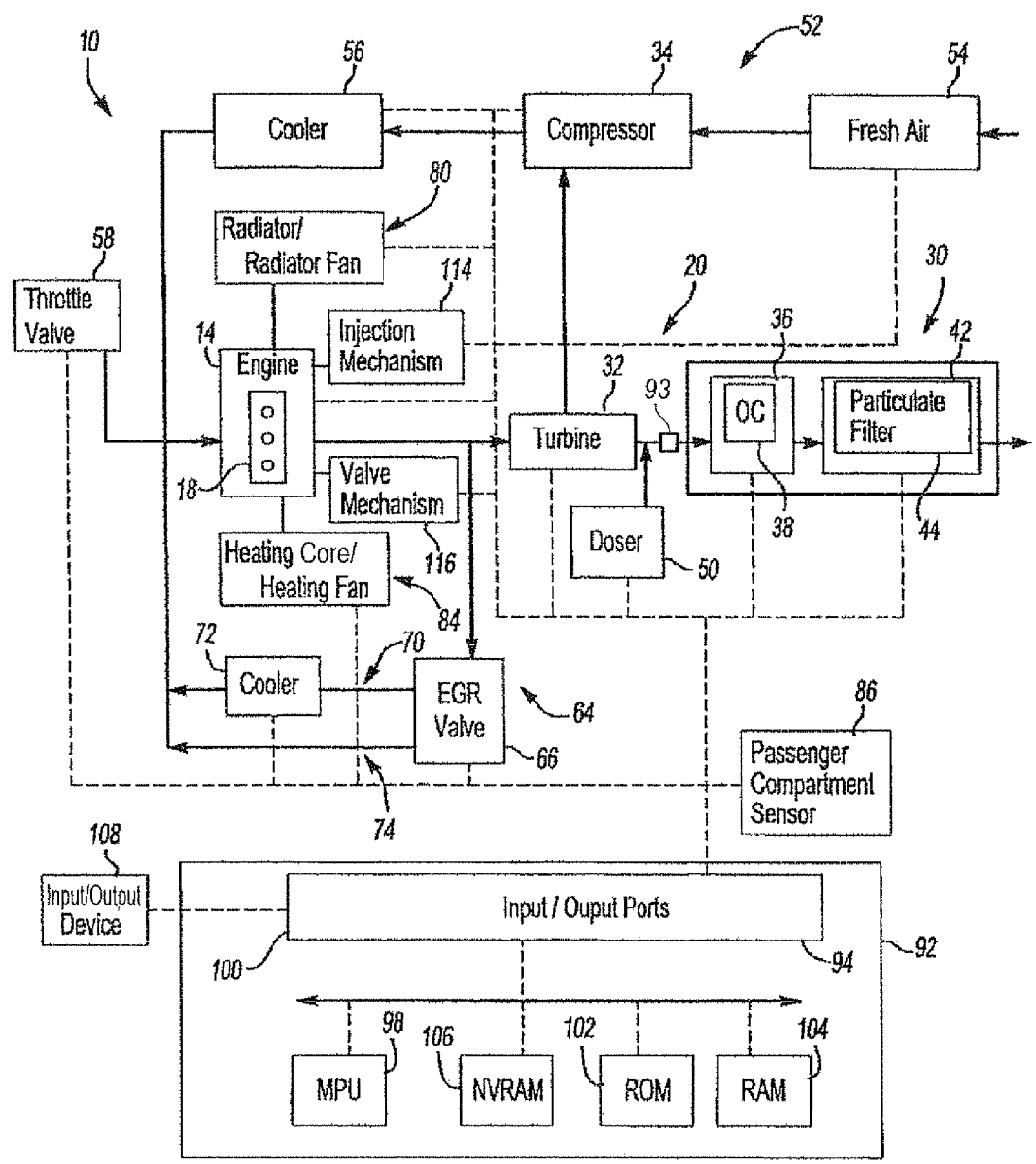
FIG. 1 is a schematic representation of and internal combustion engine with an electronic control.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with a spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbo compound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions there between to store the OC 38 and particulate filter 44, respectively. However, the present invention contemplates that the canisters 36, 42 and devices therein may include any number configurations and arrangements for oxidizing emissions and capturing particulates. As such, present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. Optionally, the throttle intake valve 58 may also be provided to control the flow of EGR gases to the engine 14 or control both fresh air and EGR gases 64 to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming air charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an EGR cooler 72, and an EGR cooler bypass 74. The EGR valve 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant there through. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciate. It is contemplated, however, that the present invention may include more or less of these features in the cooling system 80 and the present invention is not intended to be limited to the exemplary cooling system described above.

The cooling system 80 may operate in conjunction with a heating system 84. The heating system 84 may include a heating core, a heating fan, and a heater valve. The heating core may receive heated coolant fluid from the engine 14 through the heater valve so that the heating fan, which may be electrically controllable by occupants in a passenger area or cab of a vehicle, may blow air warmed by the heating core to the passengers. For example, the heating fan may be controllable at various speeds to control an amount of warmed air blown past the heating core whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or subsystems, including an exhaust system controller to control exhaust gas temperatures, mass flow rates, and other features associated therewith. In addition, these controllers may include other controllers besides the DDEC controller described above.

In accordance with one non-limiting aspect of the present invention, the controller 92 or other feature, may be configured for permanently storing emission related fault codes in memory that is not accessible to unauthorized service tools. Authorized service tools may be given access by a password and in the event access is given, a log is made of the event as well as whether any changes that are attempted to made to the stored fault codes. It is contemplated that any number of faults may be stored in permanent memory, and that preferably eight such faults are stored in memory.

Figure 2:
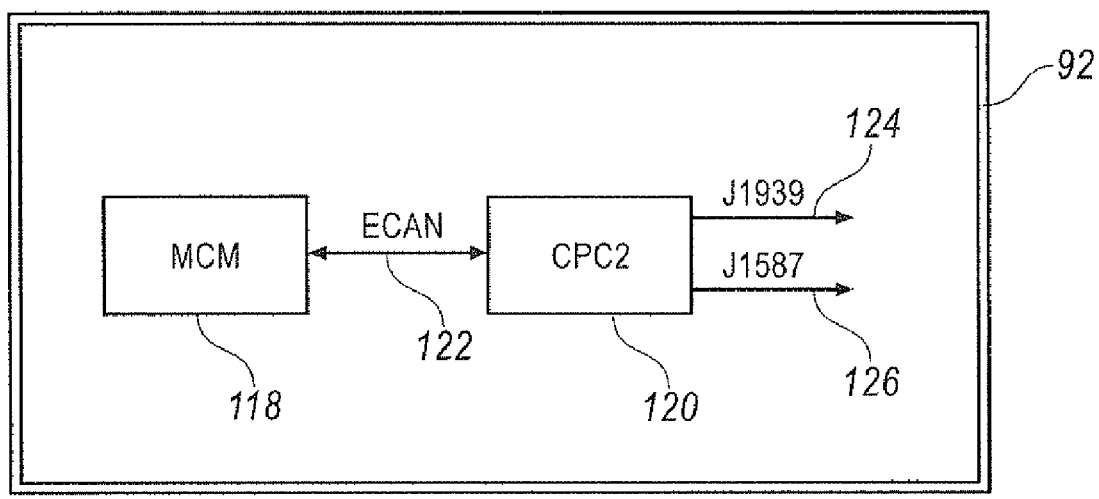
FIG. 2 is a schematic representation of the engine controller in the present invention

FIG. 2 is a schematic representation of the controller 92 of the present invention. The controller has a Motor Control Module 118 and a Common Powertrain Controller 120. Each of the Controller and the Motor Control Module has memory for storage and retrieval of operating software and faults. The Motor Control Module and the Common Powertrain Controller communicate with each other via the electronic common area network (ECAN) 122. It is contemplated that any electronic communication between the Motor Control Module (MCM) and the Common Powertrain Controller is acceptable to communicate static faults stored in either, so that each has the most current version of the faults in the other module at any time. The Common Powertrain Controller communicates with the vehicle systems via an SAE data link J1939 and J 1587, (124 and 126, respectively) and it is contemplated that it is equally possible that the Common Powertrain Controller (CPC2) may communicate with the various systems over a UDS link.

Figure 3:
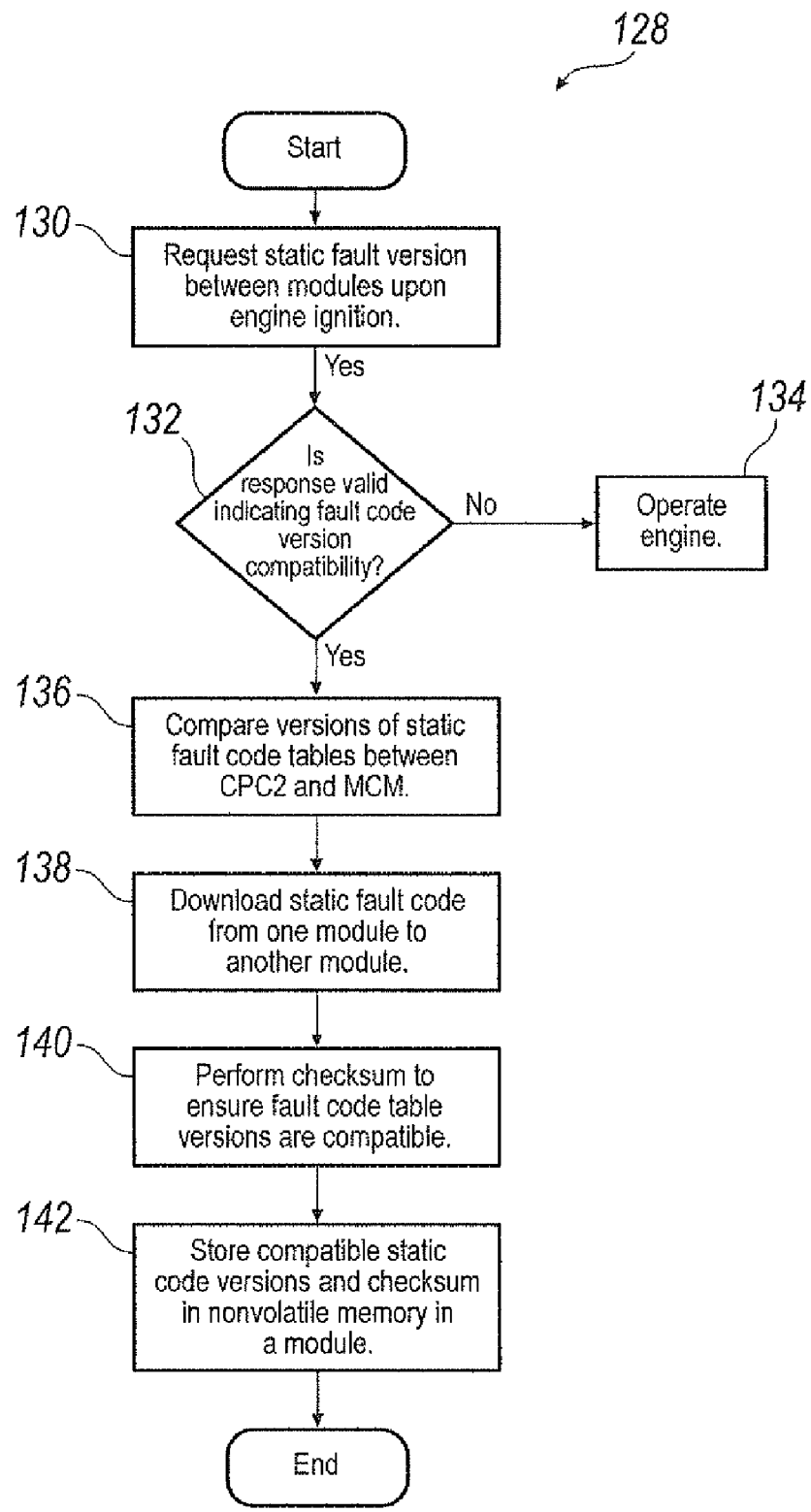
FIG. 3 is a flowchart representation of the method of the present invention.

FIG. 3 is a software flowchart of one method 128 of the present invention. Step 130 is requesting static fault code versions between modules, such as a first and second module, upon engine ignition. Step 132 is determining whether a response is valid indicating fault code version compatibility. If it is determined they are not compatible, fault may be logged and the engine continues operation, as seen at step 134. If yes, the versions are compatible, step 136 is comparing versions of static fault code tables between the modules, namely the MCM and the CPC2. Step 138 is downloading static fault code from one module to another module. Step 140 is performing a checksum to ensure that fault code table versions between modules are compatible. Step 142 is storing compatible static code versions and checksums in nonvolatile memory in a module.

The static code synchronization feature is enabled any time the UseLegacyFCMTable_flg_U1 calibration flag is cleared (FALSE) and otherwise disabled. Under normal operation, UseLegacyFCMTable_flg_u1 flag is set to FALSE (default value) and the static fault code memory synchronization feature is enabled. For the feature to work, both the CPC2 and the MCM controllers must be programmed to minimum versions supporting automated DTC (Diagnostic Trouble Code) transfer. In the situations when the CPC2 software versions which support the automated DTC synchronization are used with older MCM versions which do not, it is expected that user sets the UseLegacyFCMTable_fig_u1 flag TRUE. This will disable the automated synchronization feature and the CPC2 will use the legacy static fault code table from the last known MCM version which does not support eh auto-synch. This last known good version of the MCM static fault table is stored in program space ROM at the compile-time and shall be periodically updated in order to add new MCM MUID names for CPC2 use. Successful execution of this static FCM data synchronization feature is a pre-requisite for the CPC2's ability to report the MCMC faults. CPC2 precludes reporting any MCM failures to any communication devices or displays as a result of MCM failures until the static DTC table synchronization is completed or has been aborted. Under these circumstances CPC2 also excludes/delays logging any DM1* (ECAN ID 1629 showing current dates of MCM faults) related failures. Reporting of the DM1* delivered lamp information is allowed and supported even during the data synchronization process. (Other lamp status communication methods are also supported during the synchronization, but these fall outside of the scope of this feature.) In general the activation of dashboard lamps is allowed regardless of the success or failure of the static fault info synchronization process. Under normal operating conditions, this synchronization can take up to 60 seconds. Synchronization is required to occur only if MCM reports FCM version number/checksum which is different from the one stored in CPC2. This is expected to be the case only after one of the two controllers (CPC2 or MCM) has been replaced or reprogrammed.

If the feature is enabled and the synchronization is needed but cannot complete, or if the MCM static fault code table version cannot be obtained CPC2 shall log a fault (below) after which the processing of DM1* messages shall be aborted for the duration of the ignition cycle (with the exception of the lamp status information). (i.e. CPC2 is unable to obtain accurate MCM fault code information and is unable to act as an FCM gateway.)

At the beginning of each ignition cycle, (just or shortly after ECAN link to MCM static fault code table version via UDS service routine detailed below) if no response, or an invalid response for this request is received within 500 ms, the CPC repeats the request two more times, with 500 ms gaps in between requests. If the response is still not received, the CPC2 waits for 3 seconds and repeats the above request sequence. Finally, if no response is received, the CPC shall activate the Static MCM Fault Code Memory Unavailable failure and aborts the static memory synchronization request for the duration of the ignition cycle. (DM1* processing is also aborted.)

If the CPC2 receives a valid response to the MCM version request, it compares the newly communicated version to an internally stored value (initially set to 0) and if either of the two version components plus checksum does not match, the CPC2 commences the synchronization process via UDS service routine detailed below. If the CPC2 box is new, or at any time after an EEPROM reset or after the execution of "Set Parameter to Default" service routine, the non-volatile elements containing the MCM version information are set to 0.

In order to download the MCM's static fault code table, the CPC2 loops the UDS service $52 (Data-MCM Static Fault Code Table Request) routine from 0, i.e. the first valid MCM MUID, to "MCM MAX MUID". The CPC2 accepts all MCM data without a range-check so that the checksum can be properly verified. A range-check is to be performed over all data values just prior to the data usage.

If any of the provided values fall outside of the allowed range, the CPC2 logs the "Invalid MCM Static DTC Data Range" fault. Any value falling outside of the valid range is limited to the maximum valid value.

While downloading, the CPC2 adds each received byte to the CRC16 checksum in order to finally compare the checksum of the entire received table against the one provided by MCM in the version information. Preferably, only first 1000 faults are included. Should the two checksums not match, the CPC2 repeats the entire synchronization sequence starting with the version request. If after the second attempt the CRC16 checksums still do not match, the CPC2 aborts the synchronization process and logs the "Static MCM Fault Data CRC Fault".

Should the checksums match, the CPC2 controller commences writing of the entire MCM static table to non-volatile memory, followed by non-volatile storage of the new version and checksum information. At this point, the download process is deemed successful and the processing of the DM1* message is allowed to resume.

Upon the next ignition cycle, the CPC2 recovers the static fault table from Flash Memory and in the process re-computes the checksum. Should this computed value not match the one stored with the MCM version information, the CPC2 commences the new download sequence. This ensures that any errors that might have occurred during the flash write in the previous cycle are corrected. This is important because it is conceivable that the table flash write might not complete under all circumstances, e.g. a battery power is disconnected, etc. The static table is large and writing will take time. In addition, any possible CPC2 flash corruptions can be automatically alleviated.

Following the successful internal checksum comparison, CPC2 shall request the previously described version info from MCM. If a valid response to this version request is received and the newly communicated version information with checksum is identical to the internally stored set of values, the CPC2 deems the synchronization process complete. From this point, the evaluation of the DM1* messages is allowed to commence. No new download is required.

The CPC2 stores the MCM static fault code table version number, total number of MCM faults and the static table checksum in the non-volatile memory.

CPC2 is able to store up to 1000 static MCM MUIDs. If the MCM is reporting more than a thousand MUIDS, the fault codes may be logged at "Insufficient Static Fault Code Storage Memory". Activation of the "silent" fault (no lamps) does not preclude the first 1000 MCM faults to be downloaded and used. The CPC2 controller behaves as if the number of faults equal to 1000 was sent via DM1* messages. The CPC2 also logs the existing "DM1* Unknown MUID" fault. The "Insufficient Storage" fault is logged only to indicate that a CPC2 software upgrade is required.

Any time after the synchronization process is aborted for any reason, and is later allowed to resume, the CPC2 repeats the entire sequence beginning with the request for version information.

The MCM stores the static fault code table version information (Version+Total Number of faults) as constant data in read-only memory. The FCM table version number is a positive, non-zero integer ranging from 1 to 0xFFFE. The version number is incremented every time even a single static FCM memory byte is updated or added. Any reported values falling outside of specified range shall be considered invalid or unavailable.

For the initial implementation, the total number of faults are equal to the MAX_MCM_MUID+1 (since 0 is a valid MUID). This implies that no static memory table gaps are allowed. Once the MCM implements the MUID changes, this connection is lost and the MAX MUID number sent could be greater than the number of faults.

The MCM computes the checksum over the first 1000 entries of the static fault code memory table plus the version block minus the checksum fields at start of each ignition cycle. This checksum value is reported together with other version information in UDS Service Routine $51. The checksum is computed using a standard CRC16 algorithm. No response to service routine $51 is given until the checksum computation is completed. If the checksum computation is not finished and the request is received, the request is simply dropped. The MCM does not respond to an old (outdated) request at a later time.

In one aspect of this invention, the MCM no longer equates the MUID with the row index of the MU control table. Instead each element of the MCM MU control table shall is expanded by two bytes indicating the MUID which, once assigned, is no longer to be altered. This design modification of the MCM fault control system is advantageous because it ensures that the MUID of a fault does not change with positive static fault code memory shifts and rearrangements. This in turn is essential since the CPC2 control logic requires accurate fault status of specific MCM MUIDs. If these are rearranged in the CMM fault code memory, the CPC2 will end up monitoring unintended failure codes.

If for any reason the CPC2 is unable to receive the MCM fault code table version or the table synchronization process has been aborted (e.g. the ECAN link to MCM has been severed or the UDS connection cannot be established, no reply to the MCM DTC table version request is received, etc. . . . ) the CPC2 logs at least one of the following fault codes.

Static MCM Fault Code Memory Unavailable. The environmental condition for this and all below faults is the UseLegacyFCMTable_fig_u1 calibration set to FALSE. Once logged, this fault is latch active for the duration of the ignition cycle. The following additional fault parameters are specified: Timer Type NON, de-bounce time 0, recovery time 0xFFFF, healing time 15 minutes. When active, the fault illuminates the CEL lamp.

This fault code is used as an exclusion condition for all existing DM1* failures.

Invalid MCM Static DTC Data Range fault is activated whenever the MCM provides a static fault data falling outside the valid range. The fault does not illuminate a CEL, but is logged active for the duration of the ignition cycle. It indicates an inconstancy with the MCM static fault table which must be corrected with the new build of the MCM software.

Insufficient Static Fault Code Storage Memory fault is activated when the MCM reports the number of faults exceeding the maximum which the CPC2 is able to accept (i.e. 1000). Once logged, it is latched active for the duration of the ignition cycle. The following additional fault parameters are specified: Time Type NON, de-bounce time 0, recovery time 0xFFFF, healing time 15 minutes. When active, the fault does not illuminate any lamps.

Static MCM Fault Data CRC Fault is logged whenever the MCM is reporting the static FCM table checksum information which does not match the CPC2 computed checksum. Once logged, it is latched active for the duration of the ignition cycle. The following additional fault parameters are specified: Time Type NON, de-bounce time 0, recovery time 0xFFFF, healing time 15 minutes. When active, the fault illuminates the CEL lamp.

Static FCM Fault Data Download Timeout fault is logged whenever the download process exceeds MCMStaticDTCTableSynchTimeout_for 8 minutes since the beginning of the ignition cycle. Once logged, it is latched active for the duration of the ignition cycle. The following additional fault parameters are specified: Timer Type NON, de-bounce time 0, recovery time 0xFFFF, healing time 15 minutes. When active, the fault illuminates a CEL lamp. When active, further download attempts and the processing of the DM1* messages are aborted.

The words used in describing the invention are words of description and not words of limitation. Those skilled in the art recognize that many variations are possible without departing for the scope and spirit of the invention, as set forth in the appended claims.

What is claimed as new and desired to be protected by Letters Patent of the United States is:

1. A method to synchronize fault Code memory between at least a first module and a second module; said module in electronic communication with each other and having volatile and non volatile memory; said modules in electronic communication with each other and together forming an engine controller for an internal combustion engine, said method comprising:
   requesting a static fault version by said first module to said second module upon initiating an ignition cycle;
   receiving a valid response from said second module to said first module indicating a static fault code version resident in said second module;
   comparing versions of static code fault table in each module;
   downloading said static fault code table from said second module to said first module;
   performing a checksum in said first module to ensure versions of said static fault code tables within each said module are compatible;
   writing said compatible static fault code table to nonvolatile memory within said first module; and
   storing said compatible static code versions and checksum information in nonvolatile memory in said first module.

2. The method of claim 1, further including conducting a range check in said first module prior to using said static fault code table.

3. The method of claim 1, further including recovering said static fault code table from flash memory in said first module; determining whether said checksum matches said checksum in said second module.

4. The method of claim 3, wherein said checksums do not match and said first module commences a new download sequence.

5. The method of claim 1, wherein said first module acts as a diagnostic gateway to said second module.

6. The method of claim 1, wherein said first module is a computer processor controller and said second module is a motor control module.

* * * * *